US 6,727,938 B1

(12) United States Patent
Randall

(10) Patent No.: US 6,727,938 B1
(45) Date of Patent: *Apr. 27, 2004

(54) SECURITY SYSTEM WITH MASKABLE MOTION DETECTION AND CAMERA WITH AN ADJUSTABLE FIELD OF VIEW

(75) Inventor: Jennifer L. Randall, Lancaster, PA (US)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1062 days.

(21) Appl. No.: 08/834,073

(22) Filed: Apr. 14, 1997

(51) Int. Cl.[7] .............................................. H04N 7/18
(52) U.S. Cl. ...................................................... 348/143
(58) Field of Search ................................ 348/143, 144, 348/150, 151, 155, 154, 207, 159, 169–172, 211, 213, 145, 162, 161; 395/141; H04N 7/18

(56) References Cited

U.S. PATENT DOCUMENTS

| | | | | |
|---|---|---|---|---|
| 4,249,207 A | * | 2/1981 | Harman et al. | 358/108 |
| 4,458,266 A | * | 7/1984 | Mahoney | 358/105 |
| 4,931,868 A | * | 6/1990 | Kadar | 358/105 |
| 5,091,780 A | * | 2/1992 | Pomerleau | 358/108 |
| 5,111,288 A | * | 5/1992 | Blackshear | 358/108 |
| 5,130,829 A | * | 7/1992 | Shannon | 359/59 |
| 5,243,418 A | * | 9/1993 | Kuno et al. | 348/143 |
| 5,282,070 A | * | 1/1994 | Nishida et al. | 359/67 |
| 5,365,355 A | * | 11/1994 | Hastings, III et al. | 359/59 |
| 5,481,624 A | * | 1/1996 | Kamon | 382/144 |
| 5,517,236 A | * | 5/1996 | Sergeant et al. | 348/143 |
| 5,521,634 A | * | 5/1996 | McGary | 348/169 |
| 5,526,041 A | * | 6/1996 | Glatt | 348/143 |
| 5,615,324 A | * | 3/1997 | Kuboyama | 395/141 |
| 5,652,667 A | * | 7/1997 | Kurogane | 349/42 |
| 5,745,166 A | * | 4/1998 | Rhodes et al. | 348/143 |

* cited by examiner

Primary Examiner—Chris Kelley
Assistant Examiner—Tung Vo
(74) Attorney, Agent, or Firm—Kenyon & Kenyon

(57) ABSTRACT

A security system with a Pan/Tilt/Zoom Camera and maskable motion detection is disclosed. At selected fields of view of the P/T/Z camera, masks are created to mask, from motion detection, select sub-areas within the selected field of view. The mask created for the selected view may be saved in memory. The saved mask may be recalled and reapplied to the motion detector whenever the P/T/Z camera is repositioned to the field of view corresponding to the saved mask. The commands required to reposition the camera to each selected field of view may also be saved. The mask and repositioning commands can be associated with each other, so that selecting a target view corresponds to selecting the commands to position the camera to that view, as well as the mask to be applied for this view.

18 Claims, 6 Drawing Sheets

SECURITY SYSTEM WITH MASKABLE MOTION DETECTION AND CAMERA WITH AN ADJUSTABLE FIELD OF VIEW

BACKGROUND OF THE INVENTION

1. Field of the Invention

This invention relates to security systems, specifically security systems which employ video equipment for motion detection. Disclosed is a system which allows for motion detection of selected areas within the field of view of a video camera. This system contains an integrated control system which dynamically and automatically updates the motion detection mask to correspond to alternative views, based upon a predetermined set of criteria associated with such views.

2. Discussion of the Related Art

Video systems are well known in the field of security systems. In a typical security system, one or more video cameras are placed so as to provide a field of view of the area under surveillance. These video cameras convert a visual image into an electronic form suitable for transmission. A control station, either co-located within the surveillance area or remote from the area, receives the signals from these cameras and displays the video image at a console, for security assessment and recording. Typically, a person monitors the images from the cameras on a video screen and initiates security measures if the received image indicates unauthorized activities. Often the monitoring person (hereinafter the monitor) is responsible for monitoring the images from multiple cameras simultaneously, and means are provided to assist in this process.

Automated motion detection systems are employed to alert the monitor of the presence of activity within the view of a camera, as typified in U.S. Pat. No. 4,458,266. These motion detection systems operate by detecting changes in the sequential electronic images of the same scene. A change in the scene implies the entry or exit of an item from that scene. When a change is detected, an alarm is sent to the monitor for a security assessment. The monitor will view the sequence of images which caused the alarm, as well as other images, from this camera or others, to determine whether the alarm requires the initiation of security measures such as notifying the police or activating a warning signal. These motion detection systems can be co-located with the camera, or remote from the camera. They are often co-located with the camera and operate so as to transmit the images to the control station only in the event of an alarm, thereby saving communications bandwidth and costs.

These motion detection systems are highly effective in areas within which little or no activity is expected to take place, for example, in office buildings or parking lots after business hours. Motion detection systems are not as effective in the security of areas within which activity is normally expected, because the number of alarms which will be sent will overburden the monitor.

Within a field of view of a camera, there are often areas within which minimal activity is expected to take place, and other areas of higher activity. For example, within a bank, one would expect activity at the counter, but might expect minimal activity at the entrance to the safe. It would be desirable to send an alarm, or more descriptively, an alert, to the monitor each time activity occurred at the entrance to the safe, but not each time activity occurred at the counter. A separate camera, with a limited field of view, may be dedicated to the view of the entrance to the safe to provide this selective security. A motion detector attached to the camera would alert the monitor of activity near the safe. Alternatively, sections of the received image of a wider field of view could be purposely excluded from the motion detection system, also disclosed in U.S. Pat. No. 4,458,266. This purposeful exclusion of portions of the image is termed herein as masking. A camera with a view of the bank counter and safe could employ a motion detector with the bank counter masked out. The picture elements (pixels) of the video image corresponding to the area to be excluded from motion detection are blacked-out, or masked, so that subsequent images within this area remain constant, regardless of the actual activity as seen by the video camera. For this masking of selective portions of the video image to be effective, the correspondence between the masked pixels and the excluded area must be maintained. Typically, the mask is created when the camera is initially positioned, blanking out the selected areas within the camera's fixed field of view. A change of environment, such as a remodeling of the secured area, or repositioning of the camera, requires the creation of a new mask for the changed view.

Also common in security systems are cameras with adjustable fields of view. Such security systems allow the monitor to adjust the camera's field of view to better assess the situation. The adjustment of the camera's field of view is conventionally described in terms of pan (adjustment in the horizontal direction), tilt (adjustments in the vertical direction), and zoom (adjustment of the magnification of the image). Conventionally, systems which provide for pan, tilt and zoom cameras (hereinafter P/T/Z cameras) are incompatible with motion detection systems. A change of the camera field of view will be detected by most motion detection systems as a detected motion, because the motion detection system does not distinguish between an image change caused by movement of the camera or by movement within the camera's field of view. Tradition P/T/Z camera systems, if equipped with motion detection systems require the monitor to disable the motion detector prior to the pan/tilt/zoom movement, then to reenable the motion detector when the movements are complete. Experience has shown that monitors commonly forget to reenable the motion detector, obviating their effectiveness as a security device.

P/T/Z camera systems are further incompatible with selective area motion detection, as described above, because a pan/tilt/zoom movement changes the camera's field of view, invalidating the correspondence with the installed motion detection mask. For selective area motion detection, an adjustment to a camera's field of view requires a corresponding adjustment to the motion detection mask. Typically, this requires the creation of a new mask, specific to this new field of view. Because the creation of a new mask is a time consuming process, and because a P/T/Z camera has an infinite number of possible fields of view, each requiring a different mask, selective area motion detector systems rarely employ P/T/Z cameras.

An automated adjustment of a mask, to correspond to a change in the camera's field of view cannot be made unless the adjustment of the camera's field of view is integrated into the motion detection mechanism. Conventionally, the continuous recomputation of a mask, as the camera is adjusted, requires a continuous awareness of the changes in the camera's field of view, in terms of the angular rotation through the horizontal and vertical axes, as well as changes in the lens magnification factors. Such a computation would involve complex coordinate transformations, as well as continuous feedback from the camera related to its field of view parameters. Such a system would be extremely costly, if at all practical.

SUMMARY OF THE INVENTION

It is the purpose of this invention to provide a system which provides for selective area motion detection using conventional pan/tilt/zoom camera technology, without requiring complex coordinate transformation techniques.

This invention is premised on the observation that, even though a P/T/Z camera may have an infinite number of fields of view, a select subset of views are often sufficient to provide for the security of the entire area under surveillance. Further, although the P/T/Z camera may be continually changeable, by a continuous activation of the pan, tilt, or zoom controls, the camera is typically stationary when motion detection is utilized.

In accordance with this invention, at each select, stationary, field of view, a mask image corresponding to this view may be downloaded into the mask of the motion detector. A set of masks, each corresponding to a select field of view, are stored, or computed, at the monitor station, and downloaded as required. Any and all processing to create each specific mask image need not be performed in real time, as the camera is moving, nor need it be performed after each P/T/Z camera movement. By providing for the Is loading of a mask corresponding to a particular view, the motion detector system can be one with minimal capabilities, and hence, minimal costs. The effectiveness, and cost, of the system will be determined merely by the number of select views for which a mask is required. In a preferred embodiment, a fixed set of predefined views, each with a predefined mask, are created and stored at the monitor station when the system is deployed, and thereafter as the environment may change. The monitor need merely choose one of these predefined views as a target view to effect selective area motion detection utilizing the target view's predefined mask.

The selection of a predefined mask, or the computation of a new mask, still requires that the mask correspond to the camera's particular field of view. This invention is further premised on the observation that, in today's technology, there is an extremely high correlation between the commands transmitted to a camera and the camera's actual physical movement. That is, a repetition of the same command, or set of commands, will result in the camera being positioned to the same field of view. Thus, it is not necessary to know the actual orientation angles and magnification factor corresponding to the camera's field of view; it is sufficient to know the commands required to recreate the view. Because there is strong correlation and repeatability between commands and the actual camera field of view, a system in accordance with this invention can establish the correspondence of a particular mask to a particular view by storing the commands required to create, or re-create, the view.

In a preferred embodiment of this invention, the monitor will execute the appropriate commands to adjust the camera to produce a desired field of view, as viewed on the console. This particular view will be given a unique identifier, or address. The commands executed to move the camera to reproduce this view will be stored as the commands associated with this view. The monitor will then identify the areas selected for exclusion from motion detection; the corresponding mask will be stored as the mask image associated with this view. The monitor will repeat the above sequence for additional, uniquely identifiable, views.

Thereafter, having identified specific views, and having stored the camera positioning commands and mask image associated with each view, the monitor need merely instruct the system to 'go to' a desired view. In response to this 'go to view' command, the system will transmit the stored commands to adjust the camera to produce this view, then download the mask associated with this view. Note that, in this embodiment, coordinate transformations are not performed, and the camera field of view parameters, per se, are not required, thereby allowing for the use of conventional, low-cost, cameras and motion detectors.

In a further embodiment, motion detection can be automatically disabled while the camera is in motion, and automatically reenabled when the camera is positioned to the new view and the new mask is loaded.

These and other advantages will be readily apparent to those versed in the art, with reference to the following detailed description and drawings.

DETAILED DESCRIPTION OF THE PREFERRED EMBODIMENTS OF THE INVENTION

Figure 1A:
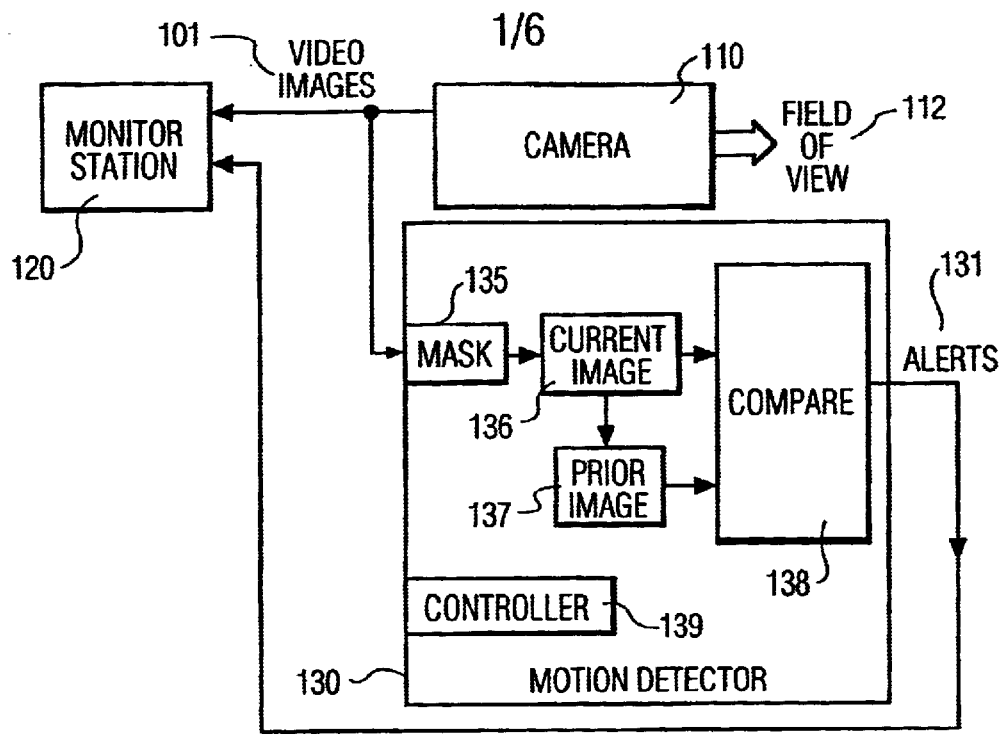
FIG. 1 shows a video security system with a motion detector.

FIG. 1 shows a video security system with a motion detector, as known in the current art. Video images 101, in the form of frames, are produced by the camera 110. These images are representative of the camera's field of view 112. The field of view is established by the camera's location, orientation, and lens configuration. In FIG. 1a, the video images 101 are simultaneously sent to the monitor station 120 and the motion detector 130. The motion detector 130 compares a current image 136 to a prior image 137, under the control of a controller 139. The compare block 138 asserts an alert signal 131 whenever the current image 136 differs substantially from the prior image 137. The difference between the images may be measured by the number of picture elements (pixels) having a different value, for example. If the number of differing pixels exceeds a threshold value, an alert is transmitted to the monitor station. The use of a threshold allows the motion detector to be insensitive to small changes, such as caused when small animals traverse the camera's field of view. After comparison, via the controller 139, the current image 136 becomes the prior image 137, in preparation for receipt of the next frame of video image 101.

Figure 2A:
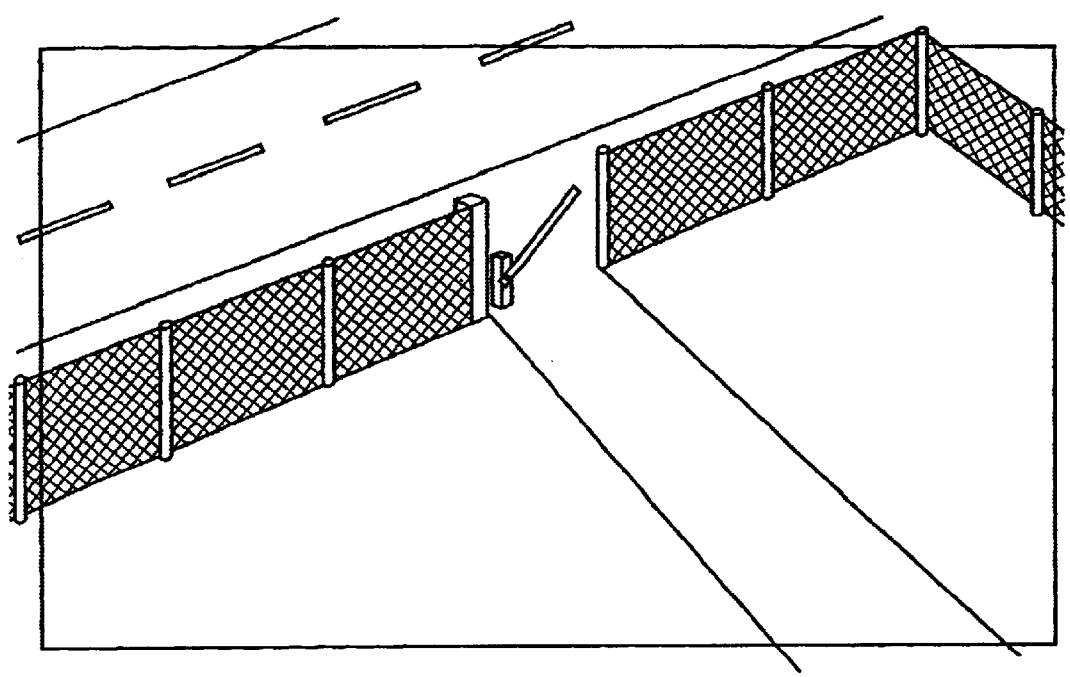
FIG. 2 shows an scene with a corresponding mask image.
Figure 2B:
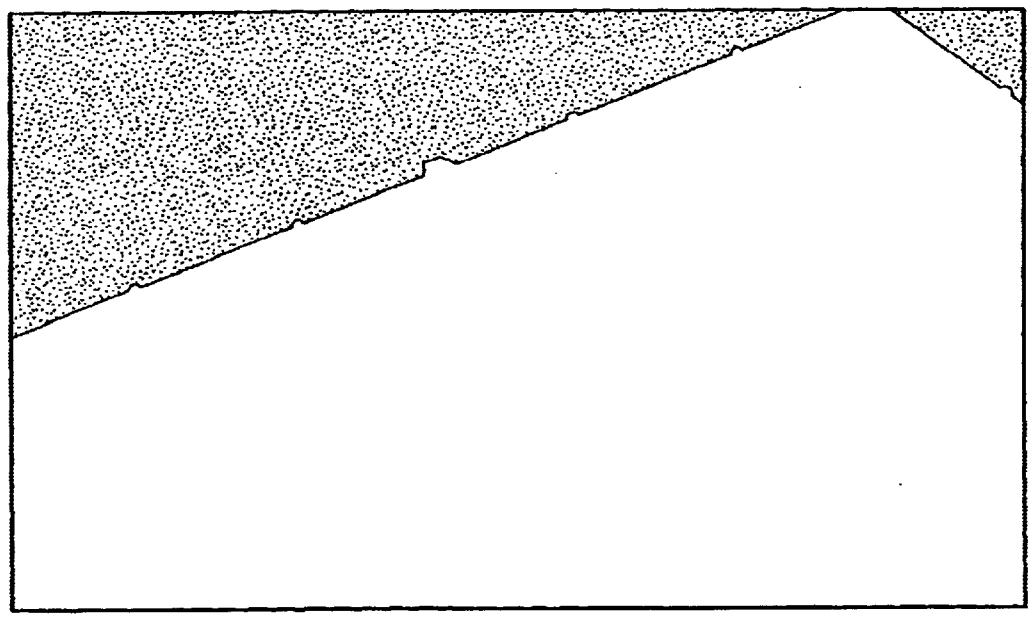

The motion detector 130 contains an optional mask feature. If certain areas of the camera's field of view are expected to contain motion for which alerts are not desired, these areas can be masked, or blocked, from the motion detection process. A field security system, for example, may be designed to detect entry onto unauthorized areas from a common thoroughfare, such as a public road or walkway. The portion of the common thoroughfare within the camera's field of view can be masked from the motion detector by blocking out those pixels of the video image 101 corresponding to the thoroughfare. This blocking out, or masking, is performed by the mask block 135. Since the mask is applied to the receive image prior to the current image block 136, all current images, which subsequently become prior images, will contain the same pixel representations of the masked area, typically an all white or all black image. A comparison between a current and prior image within the masked area will always show the same pixel values, regardless of the actual changes to the image in the masked area. Note that, in a typical system, the monitor station receives the full, unmasked image, showing all motion, but the monitor is not alerted to motion except in the unmasked areas. FIG. 2 shows a typical image and mask as might be created for a camera positioned with a field of view about an entry gate. Note that, in a typical system, the mask is created when the system is installed, and need not be changed unless the camera is moved, or the areas of interest are modified.

Figure 1B:
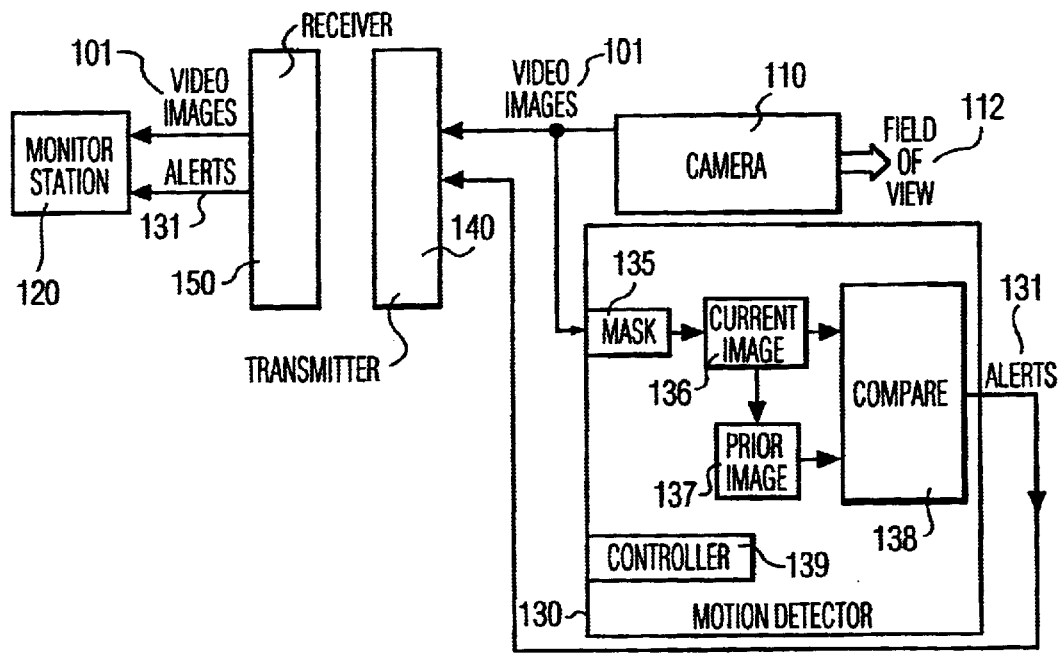

FIG. 1b shows a security system with a remote monitor station. Images 101 and alerts 131 are communicated to the monitor 120 via the transmitter 140 and receiver 150. Optionally, the transmitter 140 may be designed to only transmit video images 101 upon command from the monitor, or upon an asserted alert signal from the motion detector 131. Typically, the transmitter may contain one or more video image buffers. Upon the detection of motion, as signaled by the alert signal 131, the transmitter will transmit the current video image, as well as prior and subsequent images, to aid the monitor in an assessment of the security situation.

Figure 3A:
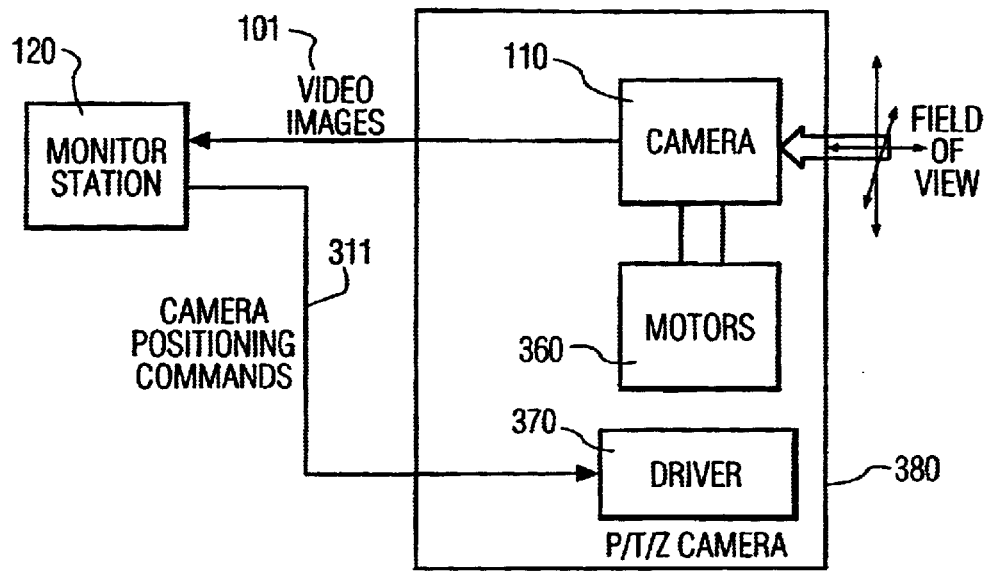
FIG. 3 shows a video camera with an adjustable field of view.

FIG. 3 shows a security system comprising a camera with a dynamic field of view. Motors 360 adjust the orientation and lens configuration of camera 110. Typically, three motors are provided. A pan motor provides camera rotation in the horizontal plane; a tilt motor provides camera rotation in the vertical plane; and a zoom motor provides for a lens adjustment. A camera with an adjustable field of view 380 is traditionally referred to as a Pan/Tilt/Zoom (P/T/Z) camera. The motors 360 are activated by a driver device 370 in response to camera positioning commands 311 sent by the monitor station 120. Such commands may be generated by the monitor's use of an input device (not shown) such as a joystick, mouse, or keyboard. Typically, the commands are simply Up/Down, Right/Left, and ZoomIn/ZoomOut. The amount of camera motion is determined by the duration, in time, that the particular command is asserted. Such commands are "relative" positioning commands, because the resultant camera orientation will be relative to its prior orientation. Optionally, a more sophisticated driver 370 may allow for "absolute" positioning commands, such as "GoTo X,Y,Z", where X is the angular horizontal position, Y is the angular vertical position, and Z is the magnification factor. A driver 370 may also allow for the local storage of such X,Y,Z parameters as a single identifier N, thereby allowing for the positioning of the camera via a "go-to-N" command. Upon receipt of an absolute positioning command, the driver will determine the appropriate relative motor movements required to move from its current orientation to the specified orientation. Feedback from the motors and camera may also be employed to assure proper positioning. In a simpler embodiment, the feedback from the camera merely comprise the video image 101, and the monitor makes the appropriate adjustments, via the positioning commands 311, until the desired field of view is seen at the monitor station 120. In such an embodiment, the actual angular orientation or magnification factor of the camera is unknown to the monitor or the monitor station.

Figure 3B:
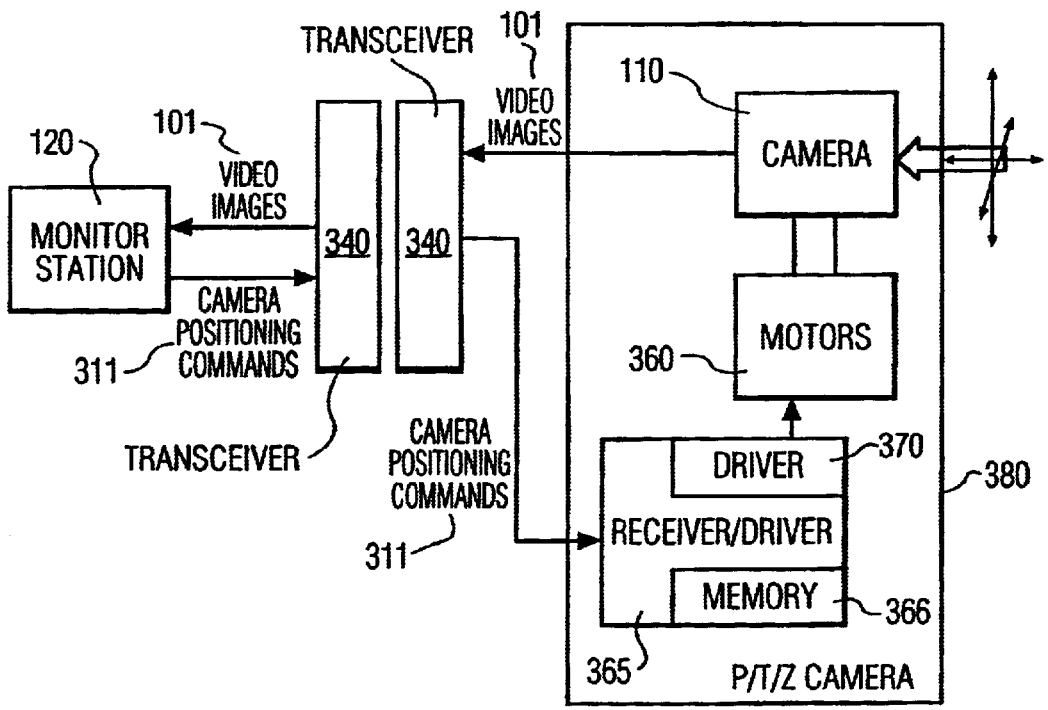

Shown in FIG. 3b is a remotely controlled camera with a dynamic field of view. Transceivers 340 are employed to communicate the video images 101 and camera positioning commands 311 between the monitor station and the camera location. In a remote configuration, the adjustment of a camera's field of view becomes difficult because of the delay time between the issuance of a command from the monitor station and the resultant video image. To minimize communications and time delay, the Receiver/Driver 365 is shown to have a memory capability in addition to the driver capability of block 370 in FIG. 3a. Once a desired field of view is realized, via adjustments at the monitor station, the receiver/driver 365 can be instructed to store that orientation with an associated identifier. In this manner, a set of predefined fields of views can be stored in a memory 366, for example, as "front door", "side door", "parking lot", etc. The monitor can thereafter change views from one to the other by merely communicating the identifier of the desired view to the receiver/driver 365. The receiver/driver will recall the orientation parameters associated with this identifier, and adjust the motors 360 appropriately to reorient the camera 110 in accordance with these parameters. Note that this same capability may be provided by storing the appropriate camera, positioning commands at the monitor station 120.

As discussed above, because Pan/Tilt/Zoom capabilities modify a camera's field of view, P/T/Z cameras are unusable in a security system with maskable motion detection as portrayed in FIG. 1. Each movement of the camera produces a new field of view, for which mask 133 would need to be changed. A dynamically changeable mask, corresponding to dynamically changing fields of view, would require coordinate transformations and computational capabilities far beyond those achievable within the cost and price constraints of practical security systems.

Figure 4A:
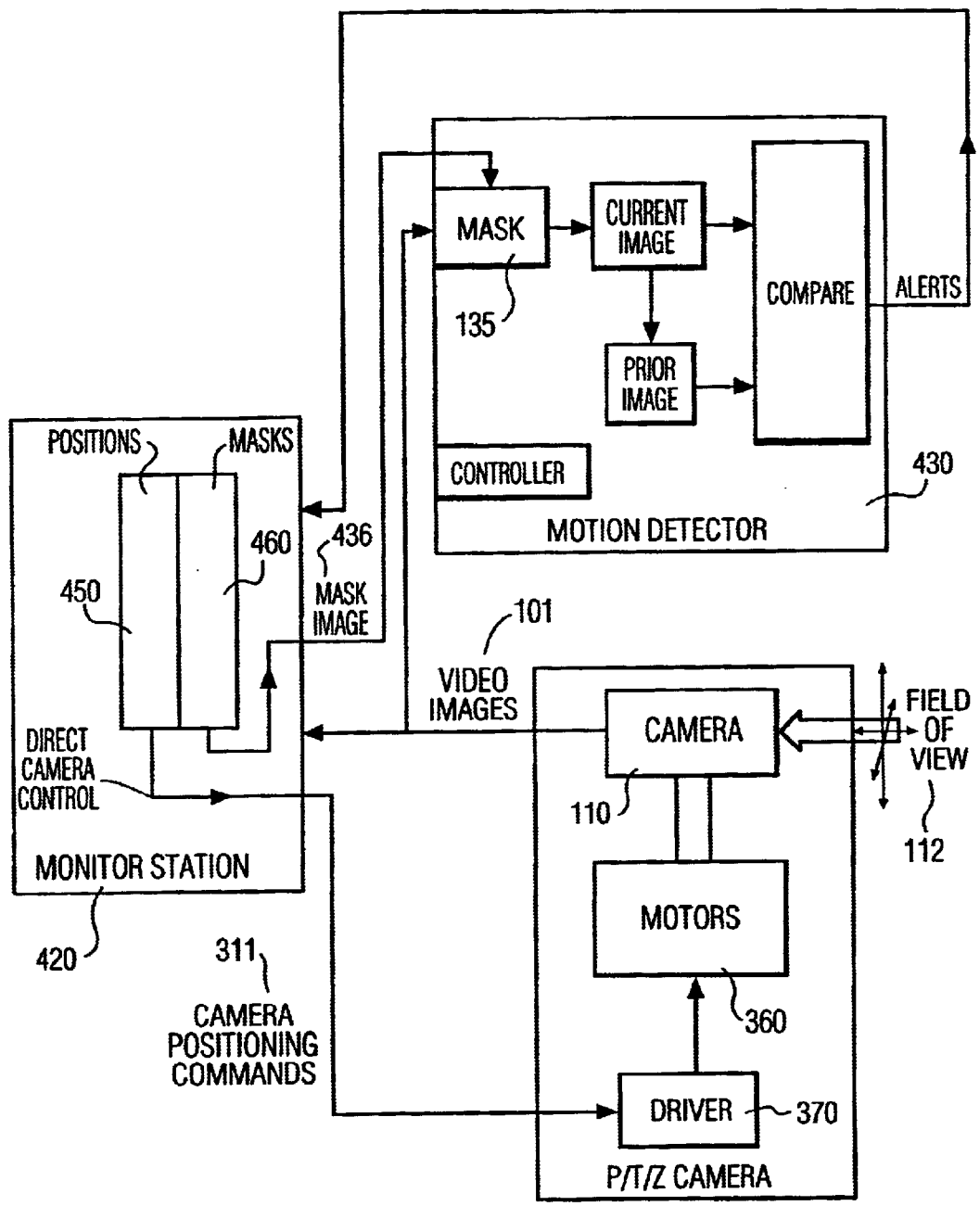
FIG. 4 shows a security system with a camera with an adjustable field of view, and a maskable motion detector in accordance with this invention.
Figure 4B:
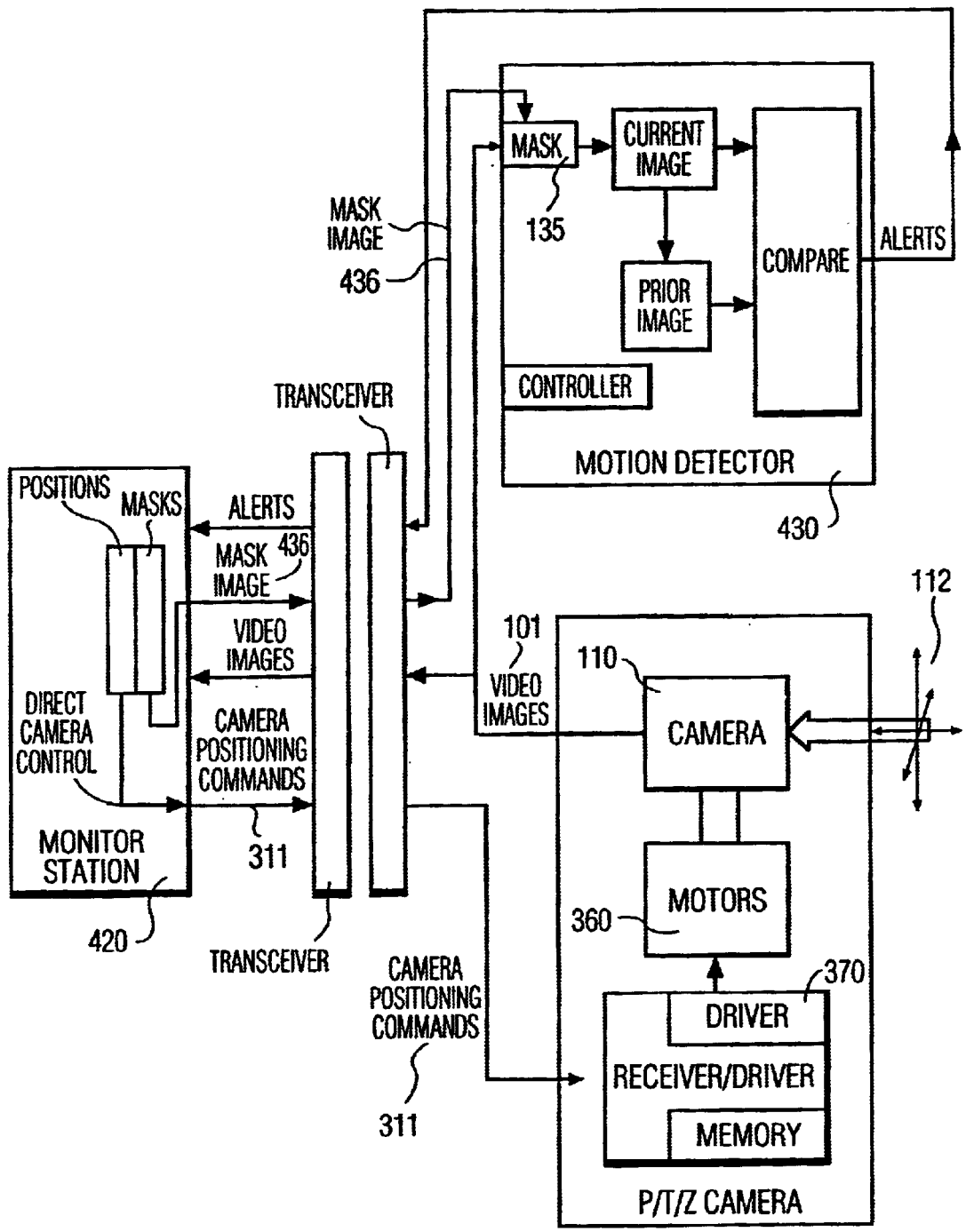

FIGS. 4A and 4B show a security system with a dynamic field of view and motion detection masking in accordance with this invention. For ease of understanding, the system is described with reference to a direct connection between the monitor station and the camera and motion detector as shown in FIG. 4a. FIG. 4b shows a system with a remote monitor station, for completeness. The system comprises elements similar in function to those in FIGS. 1a and 3a. A camera 110 provides video images 101 to the monitor station 420 and motion detector 430. Distinguished from FIG. 1, monitor station 420 comprises the ability to store a set of camera positions 450 and masks 460. Motion detector 430, in accordance with this invention, comprises the ability to replace the contents of its mask 135. As shown by the mask image signal 436, the monitor station can transmit a new mask image into the mask 135, replacing the prior mask.

As in FIG. 3, the monitor station 420 of FIGS. 4A and 4B also transmits camera positioning commands 311 to the driver 370. The P/T/Z camera's field of view 112 is adjustable via the motors 360 which are controlled by the motor driver 370 in response to these camera positioning commands from the monitor station. The camera positioning commands, in accordance with this invention, may come from direct commands, such as joystick movements or menu selections, as in FIG. 3, or from the set of positions 450, as will be discussed below.

Figure 5:
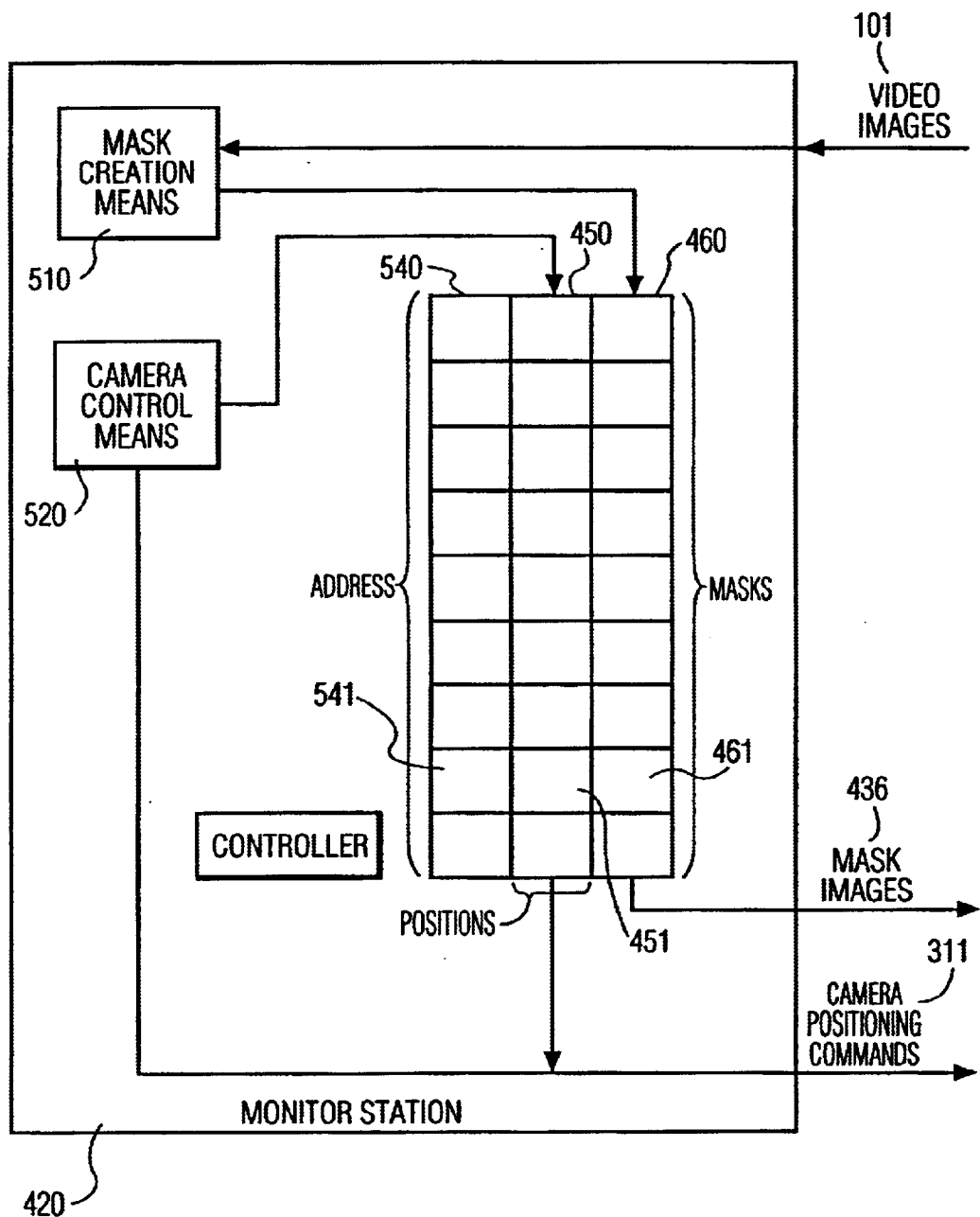
FIG. 5 shows a monitor station for a security system in accordance with this invention.

FIG. 5 provides additional detail with regard to the monitor station 420. Means 510 are provided at the control station to create masks which can be downloaded to the motion detector. In the preferred embodiment, a mask is created in conjunction with the video images 101 received from the camera. Means 520 are provided to control the camera. In the preferred embodiment, the monitor will control the camera until a desired view is achieved. The video images produced by this view will be displayed to the monitor, and the monitor will select areas of this view to be masked. Typically, this masking will be accomplished by selecting segments of the video image, using, for example, a mouse, or a touch screen, to create a mask overlay. As is evident, this mask overlay will be specific to the particular image being viewed.

Having selected a view, and creating a mask corresponding to this view, the user may store the camera position which corresponds to this view, and the mask corresponding to this view, at a selected address 540. The address 540 could be a mere index, for example, View1, View2, and so on, but preferably could be more descriptive, such as FrontDoor, ParkingLot, etc.

The monitor may then control the camera to produce a different view, create a mask corresponding to this new view, and save the camera position and mask corresponding to this view at another address. Each saved address, position, mask triplet will be saved as a related set, as depicted by address element 541, position element 451, and mask element 461, in FIG. 5. Typically, positions and masks will be created for a select set of views, covering the surveillance area as required.

Having created a set of positions and masks for the camera and motion detector, the operation of the system is straightforward. The monitor merely selects an address of interest. In response to this selection, the monitor station transmits the corresponding camera positioning commands to steer the camera to the selected view, and transmits the corresponding mask image to the motion detector to appropriately mask sections of the images from the selected view. The motion detector or the monitor station may also be provided means for disabling alerts during camera movement, and reenabling the alerts when the camera ceases movement and the new mask is loaded, to prevent the false alerts typically caused by camera motion.

Although the creation of the select views and masks is described above as a purely sequential process, i.e. define all the masks for all the views, then initiate the security functions by recalling one of the created views and masks, it is evident that not all views need be created before a created view may be utilized in a security mode. In the preferred embodiment, the set of select views is modifiable at any time, allowing the monitor to change the mask associated with a view, define a new select view and mask, or delete a previously defined select view and mask. In so doing, the system allows for changes to suit security requirements based, for example, on experience or changing conditions.

As thus far disclosed, the system in accordance with this invention provides for a dynamic camera field of view capability, with motion detection masking. Alternative embodiments will be evident to one versed in the art, consistent with this invention. For example, the selection of areas within which to detect motion could be accomplished by selecting the areas of interest, rather than by excluding areas.

As previously discussed, the camera positioning commands could be actual P/T/Z motor movement commands, or "go-to" commands, depending upon the capabilities provided at the driver 370, or receiver/driver 365.

Similarly, consistent with this invention, the motion detector 430 may contain local memory for the storage of a set of masks, and the monitor station need merely transmit a "use N" command, to have the motion detector use mask N.

In a further preferred embodiment, the set of position-mask pairs corresponding to a particular view may be further addressed by the time of day, or day of the week, etc. That is, there may be areas associated with a view for which motion is expected only during certain time periods. For example, a bank counter may be masked for motion detection during normal business hours, but should not be masked when the bank is closed. In accordance with this invention, multiple masks can be defined corresponding to the same view, same camera location, but having a different address, based on some other parameter, such as a time period. Consistent with this invention, as well, masking and alerting can be independently enabled and disabled, either directly, or dependent upon the time of day, or other parameters.

In a further preferred embodiment, the selection of views can be automated. For example, the monitor station controller 580 can be programmed to routinely step through the set, or a subset, of views to maintain surveillance. This programming could include the selection of views dependent upon the time of day, or other parameters.

Consistent with this invention, aids could be provided in the creation of masks corresponding to particular views. For example, the monitor may position the camera to a view which does not yet have a corresponding mask, but the camera's position may be between two positions which do have corresponding masks. The system could be programmed to create a mask for the intermediate position by interpolating the masks of the bounding positions. This interpolated mask could be provided to the monitor as the default mask corresponding to the intermediate position, as a starting point for creating a specific mask, or as the mask to be employed in lieu of a specific mask. In addition to interpolation, the creation of a default mask could also be accomplished through the use of expert systems, pattern recognition, machine learning, or similar computer aids. For example, if a doorway is masked in one view, the system could analyze a new view to determine if a pattern similar to the masked doorway exists in the new view. If it does, a default mask could be automatically created for this similar pattern, subject to the monitor's acceptance. The monitor is thereby relieved of the detail of creating masks for areas or features common to multiple scenes.

Also consistent with this invention, the mask can be created or modified based upon actual movements in the view. Most motion detection systems provide the ability to mark the individual parts of the image in which motion was detected. If the monitor notes this movement to be irrelevant, and expects it to happen repeatedly, the monitor can instruct the system to add the portions of the image within which motion was detected to the current mask associated with the view. For example, an image may contain a large tree, the periphery of which triggers motion detection as the leaves move. Each time such movement is reported, the monitor can append the mask. Eventually, the mask will contain a periphery image of the tree. The system could also be provided with a means for saving an oversized mask. The picture elements within which motion is detected, as well as the picture elements immediately adjacent to these portions could be saved as the new or modified mask.

Further, a default mask could be created based upon the actual coordinate transformations corresponding to a modified view. That is, the areas masked in one or more views could be assigned coordinates relative to the camera. A new mask could be created at any chosen view by rotating the masked areas through the angles traversed by the camera, and magnifying or demagnifying the areas in correspondence with the changes in the camera's zoom. This transformed mask could be applied as the starting point for creating a specific mask, or as the mask to be employed in lieu of a specific mask.

Still further, actual real-world coordinates could be determined for each location to be masked, and for the actual camera location. With this information, a mask could be automatically computed for each select camera field of view. As is evident from the above, the means for creation of a mask corresponding to a particular camera field of view are limited only by the computational resources available, and the presumed accuracy of the resultant mask.

Consistent with this invention, multiple cameras and motion detectors may be controlled by the same monitor station. In such an embodiment, the address of the stored positions and masks need merely be further delineated by the specific camera for which the stored position and mask apply.

Also consistent with this invention, the motion detection means may be contained within the camera, or within the monitor station. Further, the motion detection means may be common to multiple cameras, requiring merely that the motion detection means maintain the appropriate association of masks for, and images from, each camera.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. A surveillance system comprising:
    a video camera having an adjustable field of view,
    a motion detector for detecting motion within a selected field of view of said camera, said motion detector including:
        mask for masking portions of said video camera's field of view from said motion detecting, and
        means for loading a mask image into said mask, and said surveillance system further including,
            means for selecting a target mask image from among a set of target mask images, said selecting being in dependence upon said selected field of view of said camera, wherein said motion detecting is performed on the target mask image selected.

2. A surveillance system as in claim 1, wherein said system further comprises:
    a pan motor for rotating the video camera about a horizontal axis,
    a tilt motor for rotating the video camera about a vertical axis, and
    a zoom motor for magnifying and demagnifying the video camera's field of view.

3. A surveillance system as in claim 1, wherein said system further comprises:
    means for adjusting said camera's field of view via one or more camera positioning commands,
    means for storing a set of camera positioning commands, corresponding to the video camera's field of view, into a memory,
    means for selecting a set of target positioning commands from said memory,
    means for communicating said set of target positioning commands to the camera, to adjust said camera's field of view.

4. A surveillance system as in claim 3, wherein said system further comprises:
    means for selecting a target field of view,
    wherein said means for selecting a set of target positioning commands and said means for selecting the target mask image are both dependent upon the selected target field of view.

5. A surveillance system as in claim 1, further comprising:
    means for creating and storing one or more target mask images corresponding to the camera's field of view.

6. A surveillance system as in claim 5, further comprising:
    means for selecting from among the masked images corresponding to the same field of view in dependence upon a mask selection parameter.

7. A surveillance system as in claim 6, wherein said mask selection parameter is the time of day.

8. A surveillance system as in claim 6, wherein said mask selection parameter is the day of the week.

9. A surveillance system as in claim 5, wherein said means for creating said target mask images comprises:
    means for creating a mask image in dependence upon a previously created mask image.

10. A surveillance system as in claim 5, wherein said means for creating said target mask images comprises:
    means for creating a mask image in dependence upon detected motion within the video camera's field of view.

11. A surveillance system as in claim 1, wherein said system further comprises:
    means for deactivating the motion detector when the camera's adjustable field of view is being adjusted.

12. A surveillance system as in claim 1, wherein said system further comprises:
    means for activating said motion detector upon completion of said loading of the mask image.

13. A method for selective area motion detection, utilizing a camera with an adjustable field of view and a motion detector having a loadable mask, said method comprising the steps of:
    adjusting the camera to select a field of view,
    loading a mask image corresponding to said field of view selected into said loadable mask
    performing motion detection on said mask image corresponding to said field of view selected.

14. A method for selective area motion detection as in claim 13, wherein said adjusting of the camera comprises the steps of:
    selecting a predefined camera position,
    communicating camera positioning commands corresponding to this selected position, and
    adjusting the camera in accordance with said camera positioning commands.

15. A method for selective area motion detection as in claim 13, wherein said loading of the mask comprises the steps of:
    selecting a predefined mask image corresponding to said field of view,
    communicating the selected mask image to the motion detector, and,
    loading the selected mask image into the loadable mask.

16. A method for selective area motion detection as in claim 13, wherein said adjusting of the camera comprises the steps of:
    selecting a predefined camera position, communicating camera positioning commands corresponding to this selected position, and adjusting the camera in accordance with said camera positioning commands; and, said loading of the mask comprises the steps of:

selecting a predefined mask image corresponding to said field of view, communicating the selected mask image to the motion detector, and, loading the selected mask image into the loadable mask.

17. A method for selective area motion detection as in claim 16, wherein said selecting of the predefined camera position and said selecting of the predefined mask image are accomplished by:

selecting an address with which said predefined camera position and predefined mask image are both associated.

18. A method for selective area motion detection, utilizing a camera with an adjustable field of view and a motion detector having a maskable picture area, said method comprising the steps of:

adjusting the camera to produce a set of camera fields of view, creating a picture area mask for each of said camera fields of view, storing camera parameters in correspondence with each of said camera fields of view, storing each of said picture area masks in correspondence with each of said camera fields of view, adjusting said camera in accordance with one of the set of said stored camera parameters, loading said stored picture area mask corresponding to field of view into the motion detector, applying said mask to said maskable picture area to produce a masked picture area, so that subsequent motion detection by said motion detector does not include motion within said-masked picture area.

* * * * *

UNITED STATES PATENT AND TRADEMARK OFFICE
CERTIFICATE OF CORRECTION

PATENT NO. : 6,727,938 B1
DATED : April 27, 2004
INVENTOR(S) : Jennifer L. Randall It is certified that error appears in the above-identified patent and that said Letters Patent is hereby corrected as shown below:

<u>Column 3,</u>
Lines 26-27, change "for the Is loading" to -- for the loading --

<u>Column 9,</u>
Line 38, change "mask for masking portions" to -- a mask for masking portions --

Signed and Sealed this

Twenty-first Day of June, 2005

JON W. DUDAS
*Director of the United States Patent and Trademark Office*